United States Patent
Yang

(10) Patent No.: US 12,555,179 B2
(45) Date of Patent: Feb. 17, 2026

(54) DYNAMICALLY CONFIGURABLE VIDEO PROCESSING ARCHITECTURE

(71) Applicant: QUALCOMM Incorporated, San Diego, CA (US)

(72) Inventor: Shengqi Yang, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/732,405

(22) Filed: Jun. 3, 2024

(65) Prior Publication Data

US 2025/0371646 A1    Dec. 4, 2025

(51) Int. Cl.
*G06T 1/20* (2006.01)
*G06T 1/00* (2006.01)

(52) U.S. Cl.
CPC . *G06T 1/20* (2013.01); *G06T 1/00* (2013.01)

(58) Field of Classification Search
None
See application file for complete search history.

(56) References Cited

U.S. PATENT DOCUMENTS

| | | | |
|---|---|---|---|
| 6,798,838 B1 * | 9/2004 | Ngo | H04N 21/4621 375/240 |
| 10,701,367 B2 * | 6/2020 | Hook | H04N 19/132 |
| 10,951,874 B2 * | 3/2021 | Chen | G06T 11/40 |
| 2011/0222121 A1 * | 9/2011 | Odamaki | G06T 1/20 358/1.16 |
| 2014/0301465 A1 * | 10/2014 | Kwon | H04N 19/109 375/240.16 |
| 2018/0315153 A1 | 11/2018 | Park | |
| 2018/0315155 A1 * | 11/2018 | Park | G06N 3/063 |
| 2019/0139184 A1 * | 5/2019 | Mohammed | H04N 19/436 |
| 2024/0205434 A1 * | 6/2024 | Naito | H04N 19/174 |
| 2024/0223774 A1 * | 7/2024 | Yang | H04N 19/119 |
| 2024/0236333 A1 * | 7/2024 | Naito | H04N 19/436 |
| 2024/0314362 A1 * | 9/2024 | Ghaznavi Youvalari | H04N 19/157 |
| 2025/0119541 A1 * | 4/2025 | Li | G06N 3/0464 |

* cited by examiner

*Primary Examiner* — John W Miller
(74) *Attorney, Agent, or Firm* — QUALCOMM Incorporated

(57) ABSTRACT

Certain aspects of the present disclosure related to techniques and apparatus for dynamically configuring a video processing architecture. An example apparatus generally includes memory and one or more processors. The one or more processors include a first group of video processing pipelines in data communication with the memory and a second group of video processing pipelines in data communication with the memory. The one or more processors further include control logic including a first pipe initiator for the first group of video processing pipelines and a second pipe initiator for the second group of video processing pipelines. The control logic is configured to selectively couple the second group of video processing pipelines to the first group of video processing pipelines or the second pipe initiator.

19 Claims, 11 Drawing Sheets

Pipe 0 = active from time 0 to time 44
Pipe 1 = only active from time 2 to time 31
Pipe 2 = only active from time 4 to time 33
Pipe 3 = only active from time 6 to time 35

| PIPE # | \ | Column # | | | | | | | | | | | | | | | ROW # |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | |
| PIPE 0 | | 0 | 1 | 2 | 3 | 4 | 5 | 6 | 7 | 8 | 9 | 10 | 11 | 12 | 13 | 14 | 0 |
| PIPE 1 | | 2 | 3 | 4 | 5 | 6 | 7 | 8 | 9 | 10 | 11 | 12 | 13 | 14 | 15 | 16 | 1 |
| PIPE 2 | | 4 | 5 | 6 | 7 | 8 | 9 | 10 | 11 | 12 | 13 | 14 | 15 | 16 | 17 | 18 | 2 |
| PIPE 3 | | 6 | 7 | 8 | 9 | 10 | 11 | 12 | 13 | 14 | 15 | 16 | 17 | 18 | 19 | 20 | 3 |
| PIPE 0 | | 15 | 16 | 17 | 18 | 19 | 20 | 21 | 22 | 23 | 24 | 25 | 26 | 27 | 28 | 29 | 4 |
| PIPE 1 | | 17 | 18 | 19 | 20 | 21 | 22 | 23 | 24 | 25 | 26 | 27 | 28 | 29 | 30 | 31 | 5 |
| PIPE 2 | | 19 | 20 | 21 | 22 | 23 | 24 | 25 | 26 | 27 | 28 | 29 | 30 | 31 | 32 | 33 | 6 |
| PIPE 3 | | 21 | 22 | 23 | 24 | 25 | 26 | 27 | 28 | 29 | 30 | 31 | 32 | 33 | 34 | 35 | 7 |
| PIPE 0 | | 30 | 31 | 32 | 33 | 34 | 35 | 36 | 37 | 38 | 39 | 40 | 41 | 42 | 43 | 44 | 8 |

FIG. 2

DYNAMICALLY CONFIGURABLE VIDEO PROCESSING ARCHITECTURE

TECHNICAL FIELD

Aspects of the present disclosure generally relate to video image processing systems and, more particularly, to a dynamically configurable video processing architecture.

BACKGROUND

Video image processing systems may be used in a variety of different applications, such as mobile phones, internet-of-thing (IoT) devices, extended reality (XR) headsets, and automobiles. A video image processing system may generally include a video stream processor, a video pixel processor, and a video controller. The video stream processor may perform stream-level processing tasks, such as decoding and encoding of a video stream. The video pixel processor may perform pixel-level processing tasks (e.g., motion estimation, motion compensation, filtering, post-processing) on each respective video frame included in the video stream. The video controller may control operation of the video stream processor and the video pixel processor. The video controller may also manage how decoded video frames are displayed on a display device as well as how the video frames are fed to the video pixel processor.

BRIEF SUMMARY

Certain aspects provide an apparatus comprising: memory; and one or more processors comprising: a first group of video processing pipelines in data communication with the memory, the first group of video processing pipelines comprising a first video processing pipeline and a second video processing pipeline in data communication with the first video processing pipeline; a second group of video processing pipelines in data communication with the memory, the second group of video processing pipelines comprising a third video processing pipeline and a fourth video processing pipeline in data communication with the third video processing pipeline; and control logic including a first pipe initiator for the first group of video processing pipelines and a second pipe initiator for the second group of video processing pipelines, the control logic configured to selectively couple the second group of video processing pipelines to the first group of video processing pipelines or the second pipe initiator.

Certain aspects of the present disclosure provide a method of dynamically configuring a video processing architecture, the method comprising: configuring one or more processors to have a first video processing architecture in which a first group of video processing pipelines and a second group of video processing pipelines are configured to operate in a sequential configuration; processing a video stream with the one or more processors while the one or more processors are configured to have the first video processing architecture; reconfiguring the one or more processors to have a second video processing architecture in which the first group of video processing pipelines and the second group of video processing pipelines are configured to operate in a parallel configuration; and processing one or more video streams with the one or more processors while the one or more processors are configured to have the second video processing architecture.

Certain aspects of the present disclosure provide an apparatus comprising: means for configuring one or more processors to have a first video processing architecture in which a first group of video processing pipelines and a second group of video processing pipelines are configured to operate in a sequential configuration; means for processing a video stream with the one or more processors while the one or more processors are configured to have the first video processing architecture; means for reconfiguring the one or more processors to have a second video processing architecture in which the first group of video processing pipelines and the second group of video processing pipelines are configured to operate in a parallel configuration; and means for processing one or more video streams with the one or more processors while the one or more processors are configured to have the second video processing architecture.

The following description and the related drawings set forth in detail certain illustrative features of one or more aspects.

BRIEF DESCRIPTION OF THE DRAWINGS

The appended figures depict certain features of one or more aspects of the present disclosure and are therefore not to be considered limiting of the scope of this disclosure.

FIG. 2 depicts a table illustrating inactivity of one or more video processing pipelines of the plurality of video processing pipelines of the video pixel processor of FIG. 1 according to various aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure provide apparatuses including a video pixel processor having a dynamically reconfigurable architecture and a related method for operating the video pixel processor.

As described in more detail below with reference to FIG. 1, a video pixel processor typically has a fixed architecture in which multiple video processing pipelines operate sequentially to support processing video frames at a particular display resolution (e.g., 8K resolution, such as 7680× 4320 pixels at a refresh rate of 60 Hertz). When the video pixel processor processes video frames at the particular display resolution, the video processing pipelines are utilized efficiently. However, using the video pixel processor to process video frames at lower display resolutions (e.g., 4K resolution, such as 3840×2160 pixels at a refresh rate of 60 Hertz) introduces inefficiencies as utilizing the fixed architecture to process video frames at these lower display resolutions causes one or more of the video processing pipelines to experience greater idle times since not every one of the video processing pipelines needs to be utilized at full capacity to process video frames at the lower resolutions. These greater idle times can be quantified as power losses since the one or more video processing pipelines remain active (e.g., powered on) even during the idle time.

Example aspects of the present disclosure are generally directed to a processor having a dynamically configurable architecture. As described in more detail below with reference to FIG. 3, the processor includes multiple groups of video processing pipelines and control logic that allows the multiple groups of video processing pipelines to be dynamically configured to minimize (or at least reduce) inefficiencies associated with processing video frames at low display resolutions. Furthermore, the processor may be configured to support multiple concurrent sessions, which is desirable in automotive, XR, server, and IoT applications having multiple (e.g., 32 or more) encoding/decoding sessions occurring at once.

Figure 1:
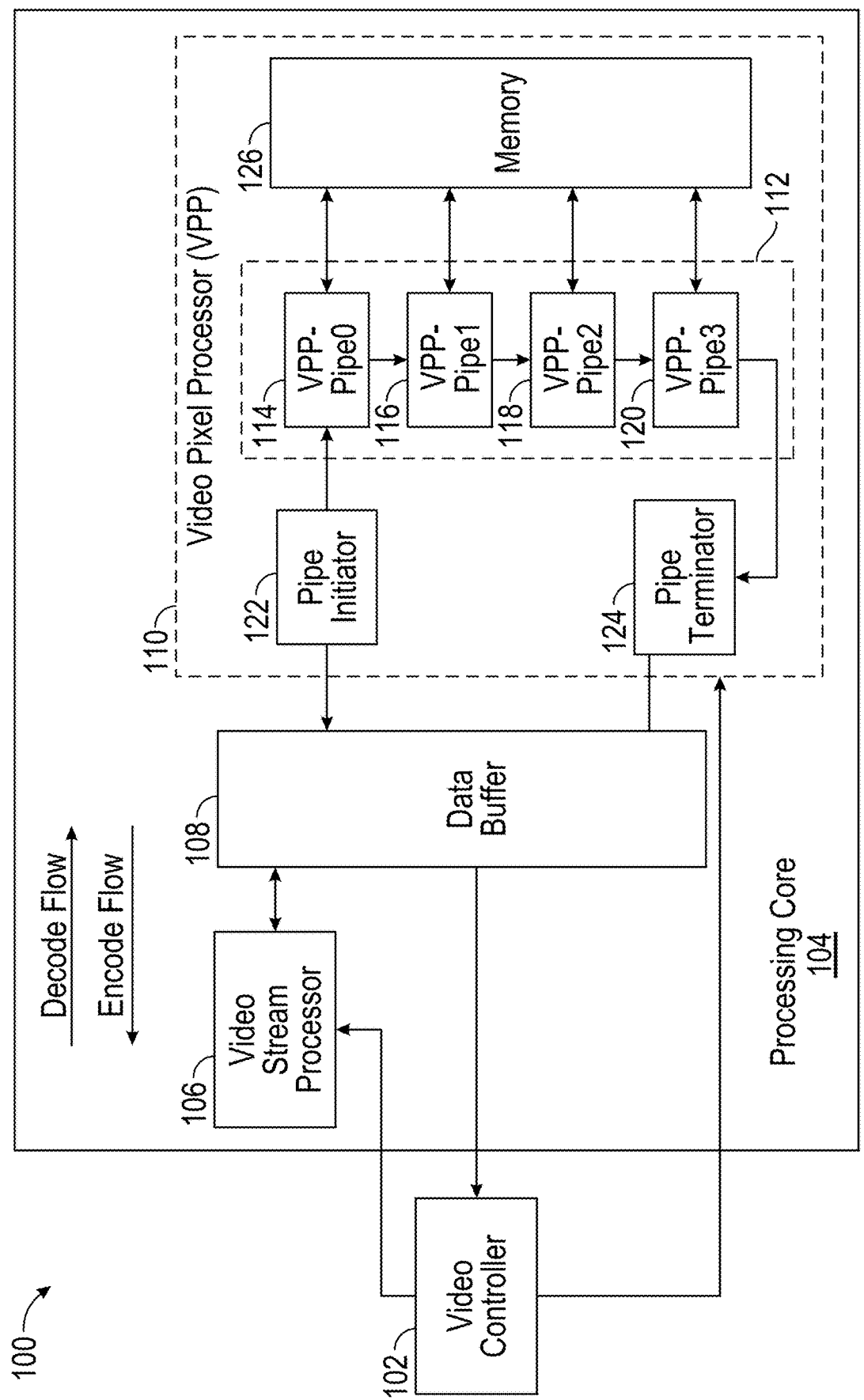
FIG. 1 depicts an example video processing system having a video pixel processor with a static architecture including a plurality of parallel video processing pipelines according to various aspects of the present disclosure.

Example Video Processing System Including a
Video Pixel Processor Having a Fixed Architecture FIG. 1 is a block diagram of components of a video processing system 100 according to various aspects of the present disclosure. The video processing system 100 may be used to encode/decode a bit stream and may be implemented in a plurality of different applications. For example, the video processing system 100 may, without limitation, be implemented in mobile phones, IoT devices, automobiles, and XR headsets (e.g., augmented reality headsets).

The video processing system 100 may include a video controller 102 and a processing core 104. The processing core 104 may include a video stream processor 106, a data buffer 108, and a video pixel processor 110. The data buffer 108 may be configured to communicate video data between the video stream processor 106 and the video pixel processor 110 during a decoding session (e.g., denoted by arrow labeled in Decode Flow in FIG. 1) or an encoding session (e.g., denoted by arrow labeled Encode Flow in FIG. 1). For example, during a decoding session, the data buffer 108 may communicate video data from the video stream processor 106 to the video pixel processor 110. Furthermore, during the encoding session, the data buffer 108 may communicate video data from the video pixel processor 110 to the video stream processor 106.

The video controller 102 may program one or more registers of the video stream processor 106 to control stream-level processing tasks (e.g., encoding, decoding) performed by the video stream processor 106 during processing of a bitstream. The video controller 102 may also program one or more registers of the video pixel processor 110 to control aspects of pixel-level processing tasks (e.g., motion estimation, motion compensation, filtering, post-processing) performed by the video pixel processor 110 during processing of an individual video frame included in the bitstream. For example, the video controller 102 may program the one or more registers of the video pixel processor 110 to control operation (e.g., filter strengths, filter boundaries) of a filtering engine of the video pixel processor 110.

Once programmed by the video controller 102, the video stream processor 106 and the video pixel processor 110 may operate to encode a bitstream or decode a bitstream. For example, to decode a compressed bitstream, the video stream processor 106 may decode the compressed bitstream to extract information (e.g., syntax, structure). The video pixel processor 110 may then perform pixel-level processing tasks on an individual video frame of the decoded bitstream based, at least in part, on the information (e.g., syntax, structure) provided by the video stream processor 106. When the video pixel processor 110 finishes processing the individual video frame of the bitstream, the video pixel processor 110 may load the processed video frame on to memory and the processed video frame may be obtained (e.g., by the video controller 102) and provided for display on a display device. In certain aspects, the memory on which the processed video frame is stored may be the data buffer 108 of the video pixel processor 110. In alternative aspects, the memory may be separate from the data buffer 108.

In certain aspects, the video pixel processor 110 may include a plurality of video processing pipelines (VPPs) 112. Each of the video processing pipelines 112 may, for example, be configured to perform pixel-level processing tasks on a respective portion of an individual video frame of a video stream. For instance, an individual video frame of a video stream may include multiple lines of largest coding units (LCUs), and each of the plurality of video processing pipelines 112 may process a different line of LCUs. More specifically, a first video processing pipeline 114 (labeled VPP-Pipe 0) of the plurality of video processing pipelines 112 may process a first line of LCUs, a second video processing pipeline 116 (labeled VPP-Pipe 1) of the video processing pipelines 112 may process a second line of LCUs, a third video processing pipeline 118 (labeled VPP-Pipe 2) of the video processing pipelines 112 may process a third line of LCUs, and a fourth video processing pipeline 120 (labeled VPP-Pipe 3) of the video processing pipelines 112 may process a fourth line of LCUs.

It should be understood that the scope of the present disclosure is not intended to be limited to the video pixel processor 110 including the number (i.e., 4) of individual video processing pipelines illustrated in FIG. 1. For example, in other aspects, the video pixel processor 110 may include more or fewer video processing pipelines than illustrated in FIG. 1.

In certain aspects, each of the video processing pipelines 112 may include multiple different engines, and each of the different engines may be configured to perform a different pixel-level task. Examples of the different engines may include, without limitation, a quantization engine, an inverse quantization engine, a transform engine, an inverse transform engine, a motion prediction engine a filtering engine, and a post processing engine.

The video pixel processor 110 may further include a pipe initiator 122. In certain aspects, the pipe initiator 122 may be a hardware component that is in data communication with the data buffer 108 and one of the plurality of video processing pipelines 112, such as the first video processing pipeline 114. In certain aspects, the pipe initiator 122 may initiate the first video processing pipeline 114 to begin processing at least a portion of a video frame.

The video pixel processor 110 may also include a pipe terminator 124. In certain aspects, the pipe terminator 124 may be a hardware component that is in data communication with the data buffer 108 and one of the plurality of video processing pipelines 112, such as the fourth video processing pipeline 120. The pipe terminator 124 may be configured to route video frame data from each of the video processing pipelines of the plurality of video processing pipelines 112 to the data buffer 108. The video frame data stored on the data buffer 108 may be used to control processing of the next video frame by the plurality of video processing pipelines 112.

In certain aspects, the video pixel processor 110 may include memory 126 that is in data communication with each of the plurality of video processing pipelines 112. During processing of a given video frame, each of the video processing pipelines 112 may collect statistics from processed lines of pixels. For example, the statistics may include line buffer data for pixel neighboring information. The statistics may be accumulated from one video processing pipeline to the next and may be ultimately provided to the pipe terminator 124. Accumulating such statistics at each of the plurality of video processing pipelines 112 increases the dependency between the video processing pipelines 112.

The video pixel processor 110 may have a static (e.g., fixed) architecture in which the plurality of video processing pipelines 112 are operated sequentially (e.g., one after the other). In this manner, the video pixel processor 110 may support processing of video streams at a high display resolution (e.g., 8K resolution). When the video pixel processor 110 is processing video frames at the high display resolution, the idle time associated with one or more of the video processing pipelines 112 may be minimal. However, when the video pixel processor 110 is processing video frames at lower display resolutions (e.g., 4K resolution), the idle time associated with the one or more of the video processing pipelines 112 may be increased. Thus, the video pixel processor 110 may experience low utilization and power losses associated with supplying power to the one or more video processing pipelines 112 during the idle time.

FIG. 2 includes a table 200 to illustrate the inefficiency of the static architecture of the video pixel processor 110 (FIG. 1) when processing video frames at lower display resolutions. The table 200 includes a plurality of rows (e.g., 0 to 8) and a plurality of columns (e.g., 0 to 14). Each cell in the table 200 corresponds to a different largest coding unit (LCU) within a line of LCUs (e.g., represented by a respective row in the table 200). Furthermore, the numbers in each cell represent timing.

The first video processing pipeline (labeled Pipe0) processes a first line of LCUs (i.e., row 0). After the first video processing pipeline processes a first LCU in the first line of LCUs at time 0 and a second LCU in the first line of LCUs at time 1, a second line of LCUs (i.e., row 1) becomes available, and the second video processing pipeline (labeled Pipe1) begins processing the second line of LCUs. After the second video processing pipeline processes a first LCU in the second line of LCUs at time 2 and a second LCU in the second line of LCUs at time 3, a third line of LCUs (i.e., row 2) becomes available and the third video processing pipeline (labeled Pipe2) begins processing the third line of LCUs. After the third video processing pipeline processes a first LCU in the third line of LCUs at time 4 and a second LCU in the third line of LCUs at time 5, a fourth line of LCUs (i.e., row 3) becomes available and the fourth video processing pipeline begins processing the fourth line of LCUs.

As illustrated, the first video processing pipeline begins processing a fifth line of LCUs (e.g., row 4) at time 15. After the first video processing pipeline processes a first LCU in the fifth line of LCUs at time 15 and a second LCU in the fifth line of LCUs at time 16, a sixth line of LCUs (e.g., row 5) becomes available and the second video processing pipeline begins processing the sixth line of LCUs. After the second video processing pipeline processes a first LCU in the sixth line of LCUs at time 17 and a second LCU in the sixth line of LCUs at time 18, a seventh line of LCUs (e.g., row 6) becomes available and the third video processing pipeline begins processing the seventh line of LCUs. After the third video processing pipeline processes a first LCU in the seventh line of LCUs at time 17 and a second LCU in the seventh line of LCUs at time 18, an eight line of LCUs (e.g., row 7) becomes available and the fourth video processing pipeline begins processing the eight line of LCUs.

When the first video processing pipeline finishes processing the fifth line of LCUs (i.e., row 5), a ninth line of LCUs (e.g., row 8) becomes available and the first video processing pipeline begins processes the ninth line of LCUs. The first video processing pipeline finishes processing the last LCU of the ninth line of LCUs at time 44.

The table 200 illustrates that the first video processing pipeline is the only video processing pipeline that is active for every time cycle (e.g., 0 to 44). The second video processing pipeline, the third video processing pipeline, and the fourth video processing pipeline are only active for 29 of the 44 time instances. More specifically, the first video processing pipeline is only active from time 2 to time 31, the second video processing pipeline is only active from time 4 to time 33, and the fourth video processing pipeline is only active from time 6 to time 35.

The table 200 illustrates the pipe dependency of the static architecture of the video pixel processor 110 discussed above with reference to FIG. 1. Also, since power is still supplied to each of the video processing pipelines during idle times, power losses occur. Furthermore, the below table illustrates that the idle time of processing pipelines increases when the video pixel processor 110 having the static architecture (4 pipe architecture) processes video frames at lower display resolutions. The table also illustrates a similar effect for another static architecture (2 pipe architecture) for the video pixel processor 110. Thus, for video pixel processors having fixed architectures, the table illustrates that idle time typically increases as the number of processing pipelines in the static architecture increases.

|  | 4 Pipe Architecture | | 2 Pipe Architecture | |
| --- | --- | --- | --- | --- |
| Display Resolution | # of Idle Pipes | % Idle time over frame processing time | # of Idle Pipes | % Idle time over frame processing time |
| Lowest | 2 | 50% | 1 | 15% |
| Low | 3 | 35% | 1 | 20% |

-continued

| | 4 Pipe Architecture | | 2 Pipe Architecture | |
|---|---|---|---|---|
| Display Resolution | # of Idle Pipes | % Idle time over frame processing time | # of Idle Pipes | % Idle time over frame processing time |
| High | 3 | 20% | 1 | 15% |
| Highest | 2 | 15% | 0 | 0 |

Example aspects of the present disclosure are directed to a video pixel processor having a dynamically reconfigurable video processing architecture. As will be discussed in more detail below with reference to FIG. 3, video pixel processors according to the present disclosure may include additional video processing pipelines to support even higher resolutions (e.g., 11K resolution and higher) than video pixel processors having the static architecture discussed above with reference to FIG. 1. Furthermore, video pixel processors according to the present disclosure may include control logic that allows one or more of the video processing pipelines to be deactivated (e.g., powered off or put into a low-power state, such as a sleep mode). For example, the control logic may be used to adjust (e.g., decrease) a power consumption of one or more of the video processing pipelines if video frames are being processed at a lower display resolution that, as discussed above, would result in one or more of the video processing pipelines being idle for a greater amount of time and thus leading to inefficiencies (e.g., in the form of power losses). Thus, video pixel processors according to the present disclosure may enhance the pipe utilization and minimize (or at least reduce) power losses due to increased idle time of one or more video processing pipelines when processing video frames at lower display resolutions (e.g., less than 4K resolution). Still further, the control logic of video pixel processors according to the present disclosure may allow the video processing pipelines thereof to simultaneously support multiple sessions. For instance, video pixel processors according to the present disclosure may be able to support multiple encoding/decoding sessions at the same time, which is important in some markets (e.g., server, IoT, and automotive applications) in which the video image processing system may be processing (e.g., encoding, decoding) several sessions at once.

Example Dynamically Reconfigurable Video Processing Architecture

Figure 3:
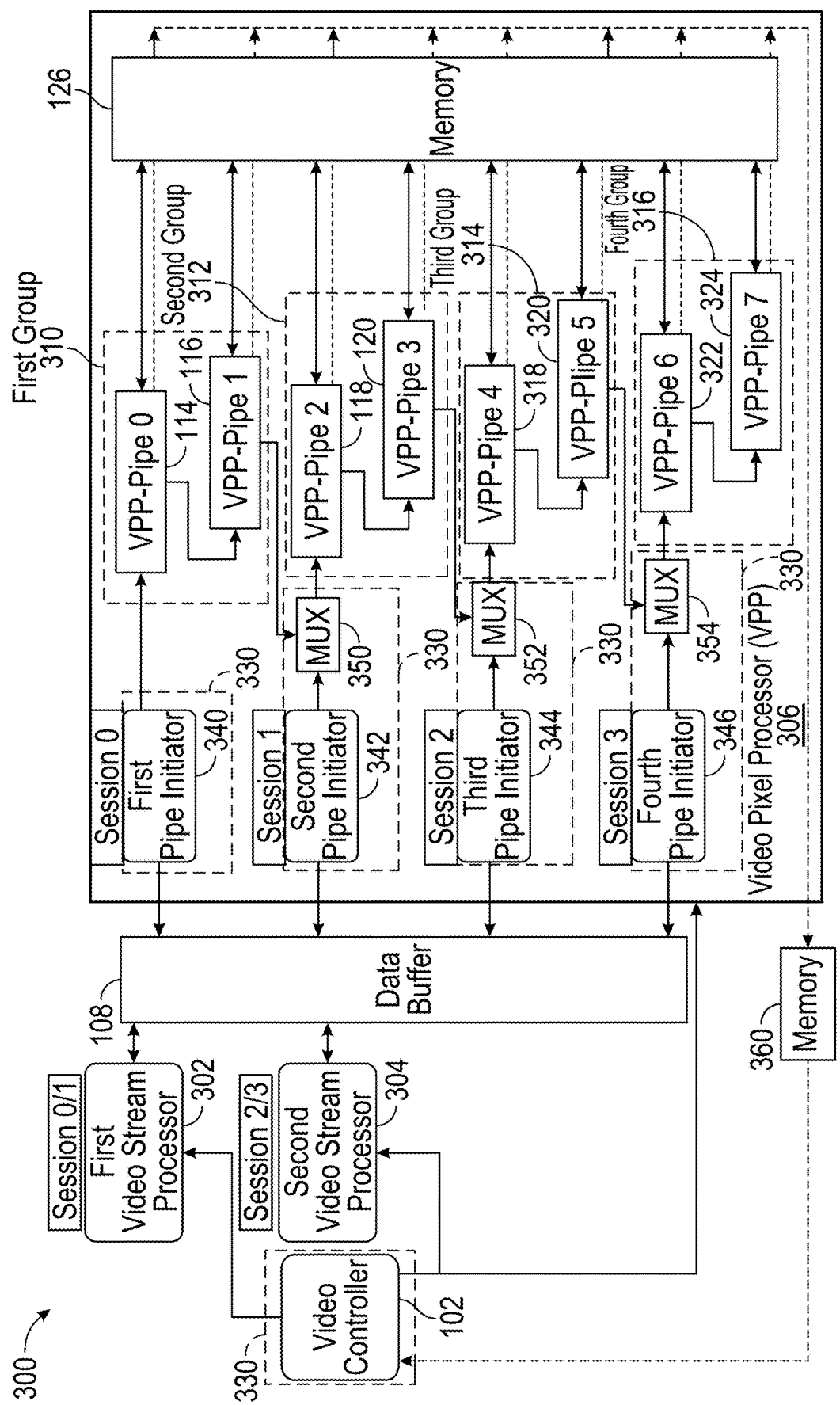
FIG. 3 depicts an example video processing system having a video pixel processor with a dynamically reconfigurable architecture according to various aspects of the present disclosure.

FIG. 3 depicts a block diagram of a video processing system 300, in accordance with aspects of the present disclosure. The video processing system 300 includes the video controller 102 and the data buffer 108 of the video processing system 100 discussed above with reference to FIG. 1. The video processing system 300 also includes a first video stream processor 302, a second video stream processor 304, and a video pixel processor 306.

The video pixel processor 306 may include the memory 126 similar to the video pixel processor 110 discussed above with reference to FIG. 1. The video pixel processor 306 may also include a plurality of groups of video processing pipelines, with each of the groups of video processing pipelines being in data communication with the memory 126.

As illustrated, in certain aspects, the plurality of groups of video processing pipelines may include a first group of video processing pipelines 310, a second group of video processing pipelines 312, a third group of video processing pipelines 314, and a fourth group of video processing pipelines 316. In certain aspects, the video pixel processor 306 may include more or fewer groups of video processing pipelines.

As illustrated, the first group of video processing pipelines 310 includes the first video processing pipeline 114 (VPP-Pipe 0) and the second video processing pipeline 116 (VPP-Pipe 1). The second group of video processing pipelines 312 includes the third video processing pipeline 118 (VPP-Pipe 2) and the fourth video processing pipeline 120 (VPP-Pipe 3). The third group of video processing pipelines 314 includes a fifth video processing pipeline 318 (VPP-Pipe 4) and a sixth video processing pipeline 320 (VPP-Pipe 5). The fourth group of video processing pipelines 316 includes a seventh video processing pipeline 322 (VPP-Pipe 6) and an eight video processing pipeline 324 (VPP-Pipe 7). In certain aspects, each group of video processing pipelines 310, 312, 314, 316 may include more or fewer video processing pipelines.

The video processing system 300 may include control logic 330 for dynamically reconfiguring the video processing architecture of the video pixel processor 306 to accommodate different use cases, examples of which are discussed in more detail with reference to FIGS. 4A-4F. The control logic 330 may include the video controller 102. The control logic 330 may further include a plurality of pipe initiators and a plurality of multiplexers of the video pixel processor 306. For instance, the plurality of pipe initiators may include a first pipe initiator 340, a second pipe initiator 342, a third pipe initiator 344, and a fourth pipe initiator 346. The plurality of multiplexers may include a first multiplexer 350, a second multiplexer 352, and a third multiplexer 354.

The plurality of pipe initiators may be activated to support multiple sessions. For instance, the first pipe initiator 340 may be activated to support a first session (SESSION 0) with the first group of video processing pipelines 310. The second pipe initiator 342 may be activated to support a second session (SESSION 1) with the second group of video processing pipelines 312. The third pipe initiator 344 may be activated to support a third session (SESSION 2) with the third group of video processing pipelines 314. The fourth pipe initiator 346 may be activated to support a fourth session (SESSION 4) with the fourth group of video processing pipelines 316.

Each of the multiplexers 350, 352, 354 may be coupled between two groups of video processing pipelines. For instance, the first multiplexer 350 may be coupled between the first group of video processing pipelines 310 and the second group of video processing pipelines 312. The second multiplexer 352 may be coupled between the second group of video processing pipelines 312 and the third group of video processing pipelines 314. The third multiplexer 354 may be coupled between the third group of video processing pipelines 314 and the fourth group of video processing pipelines 316. The multiplexers 350, 352, 354 may allow the different groups of video processing pipelines to be operated sequentially to support processing of video frames at higher resolutions.

Each of the multiplexers 350, 352, 354 may also be coupled to a respective pipe initiator. For instance, the first multiplexer 350 may be coupled to the second pipe initiator 342, the second multiplexer 352 may be coupled to the third pipe initiator 344, and the third multiplexer 354 may be coupled to the fourth pipe initiator 346. In this manner, the video pixel processor 306 may be configured to support as many as four separate sessions (e.g., SESSION 0, SESSION 1, SESSION 2, SESSION 3) at the same time.

In certain aspects, the video processing system 300 may include memory 360 that is coupled between the video controller 102 and the memory 126 of the video pixel processor 306. The memory 360 may be used to temporarily store data (e.g., accumulated statistics) received from the memory 126 of the video pixel processor 306 before being provided to the video controller 102. The memory 360 may also store data received from the video controller 102 before being provided to the video pixel processor 306. In some aspects, the data received from the video controller 102 may include instructions for configuring memory space of the memory 126 of the video pixel processor 306 based on the current video processing architecture of the video pixel processor 306. For example, if the video pixel processor 306 is supporting multiple sessions, the instructions may be for the memory 126 of the video pixel processor 306 to partition its memory space so that each of the multiple sessions has its own memory space.

Example Architecture Configurations of Video Pixel Processor

FIGS. 4A-4F illustrate different video processing architectures in which the video pixel processor 306 of the video processing system 300 may be dynamically configured to accommodate different use cases, in accordance with certain aspects of the present disclosure. It should be understood that the different architecture configurations are being provided merely as examples and the scope of the present disclosure is not intended to be limited to such architecture configurations.

Figure 4A:
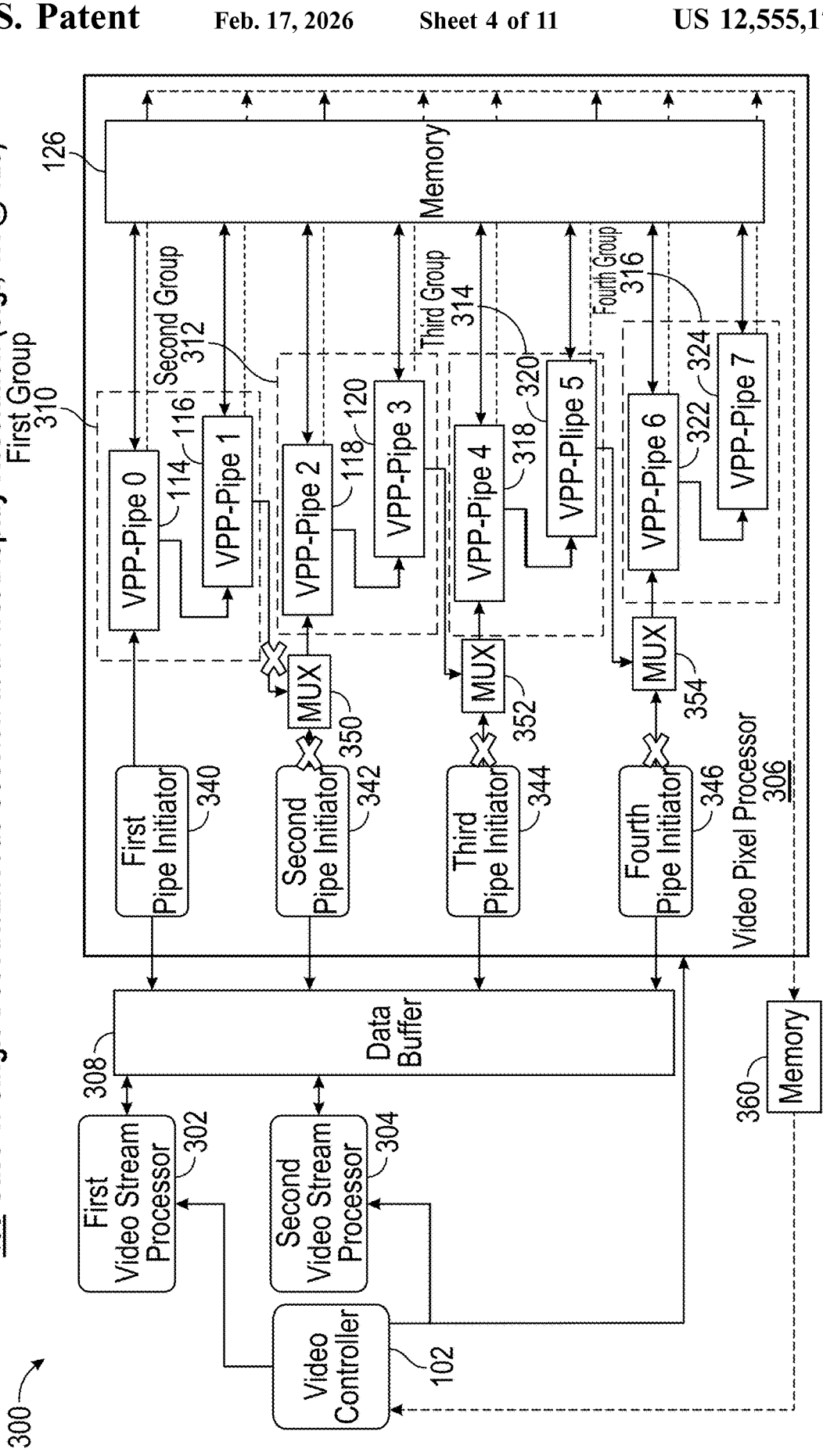
FIG. 4A depicts the video pixel processor of the video processing system of FIG. 3 dynamically configured in a first video processing architecture for a first use case according to various aspects of the present disclosure.

FIG. 4A illustrates a first video processing architecture of the video pixel processor 306 to support a first use case 400 involving a single decode/encode session at a first display resolution (e.g., 4K at a refresh rate of 120 Hz). Since the first use case involves a single decode/encode session, only the first pipe initiator 340 is active. Thus, the second pipe initiator 342, the third pipe initiator 344, and the fourth pipe initiator 346 are each inactive (e.g., denoted by X in FIG. 4A) in the first video processing architecture of the video pixel processor 306.

In some aspects, each of the first pipe initiator 340, the second pipe initiator 342, the third pipe initiator 344, and the fourth pipe initiator 346 may be configured to operate in a first power state or a second power state. Furthermore, an amount of power consumed by a pipe initiator configured in the first power state may be greater than an amount of power consumed by a pipe initiator configured in the second power state. Thus, for the first architecture depicted in FIG. 4A, the first pipe initiator 340 consumes a greater amount of power than each of the second pipe initiator 342, the third pipe initiator 344, and the fourth pipe initiator 346 because the first pipe initiator 340 is configured in the first power state (e.g., active) and each of the second pipe initiator 342, the third pipe initiator 344, and the fourth pipe initiator 346 are configured in the second power state (e.g., inactive).

In some aspects, the second power state may correspond to an off state in which no power is consumed. In alternative aspects, the second power state may correspond to a sleep state in which a nominal amount of power is consumed.

Also, since only the first group of video processing pipelines 310 is needed to process video frames at the first display resolution, the first multiplexer 350 is not configured to couple the second group of video processing pipelines 312 to the first group of video processing pipelines 310. Stated another way, the first multiplexer does not provide output from the first group of video processing pipelines 310 to the second group of video processing pipelines 312. Thus, in contrast to the static architecture of the video pixel processor 110 discussed above with reference to FIG. 1, the first video processing of the video pixel processor 306 depicted in FIG. 4A eliminates power losses associated with increased idle time of one or more video processing pipelines (e.g., second group of video processing pipelines 312) that are not needed to process video frames at lower display resolutions by decoupling (e.g., via the first multiplexer 350) the first group of video processing pipelines 310 from the one or more video processing pipelines.

Figure 4B:
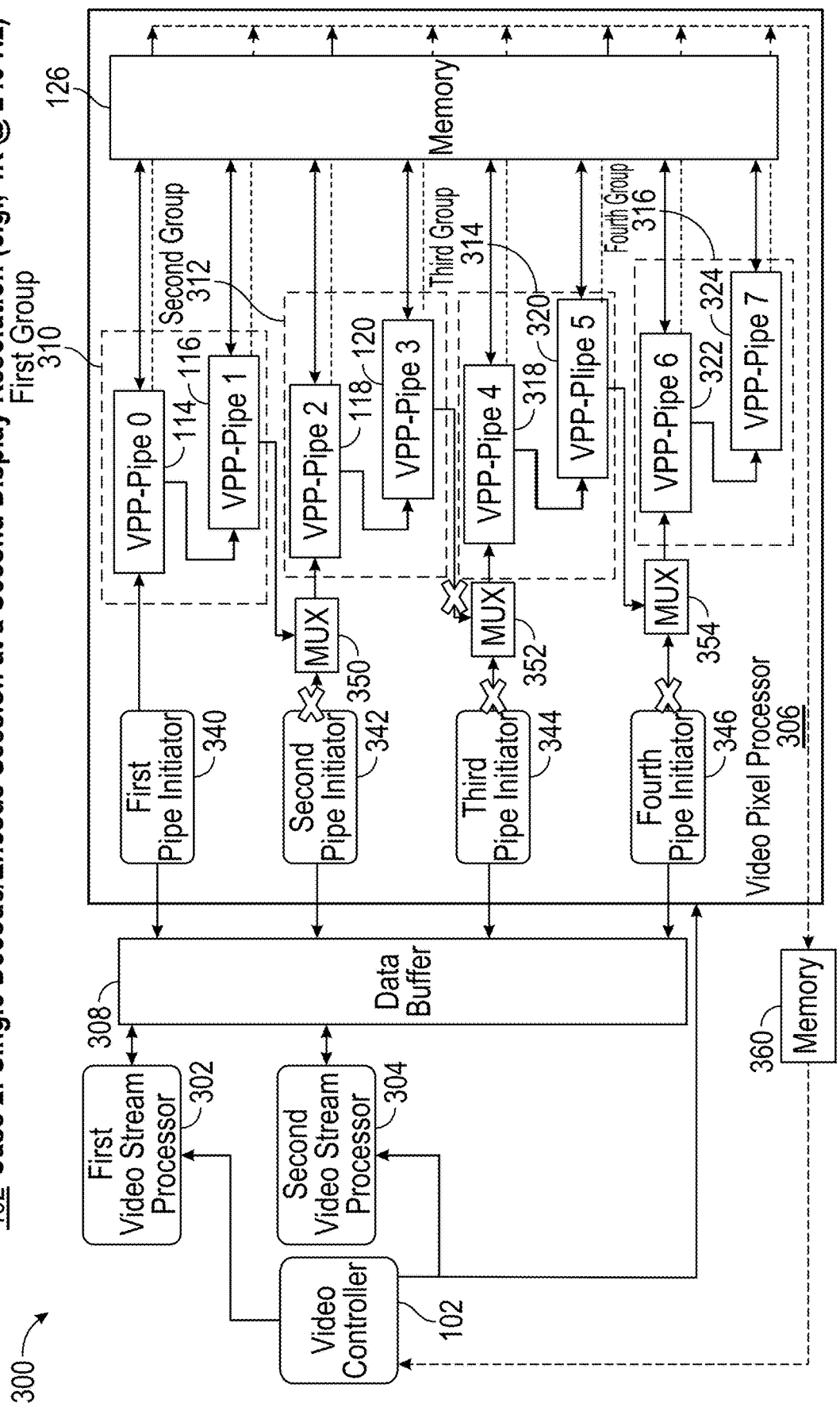
FIG. 4B depicts the video pixel processor of the video processing system of FIG. 3 dynamically configured in a second video processing architecture for a second use case according to various aspects of the present disclosure.

FIG. 4B illustrates a second video processing architecture of the video pixel processor 306 to support a second use case 402 involving a single session at a second display resolution (e.g., 4K resolution at a refresh rate of 240 Hz). Similar to the first use case 400 discussed above with reference to FIG. 4A, the second use case 402 is a single decode/encode session. Thus, only the first pipe initiator 340 is active (e.g., configured in the first power state) when the video pixel processor 306 is configured in the second video processing architecture. However, in contrast to the first use case 400 discussed above with reference to FIG. 4A, the second use case 402 utilizes the first group of video processing pipelines 310 and the second group of video processing pipelines 312. Thus, for the second video processing architecture illustrated in FIG. 4B, the first multiplexer 350 is configured to couple the second group of video processing pipelines 312 to the first group of video processing pipelines 310 so that the first video processing pipeline 114, the second video processing pipeline 116, the third video processing pipeline 118, and the fourth video processing pipeline 120 operate in a sequential configuration (e.g., one after the other) to process video frames at the second display resolution.

Figure 4C:
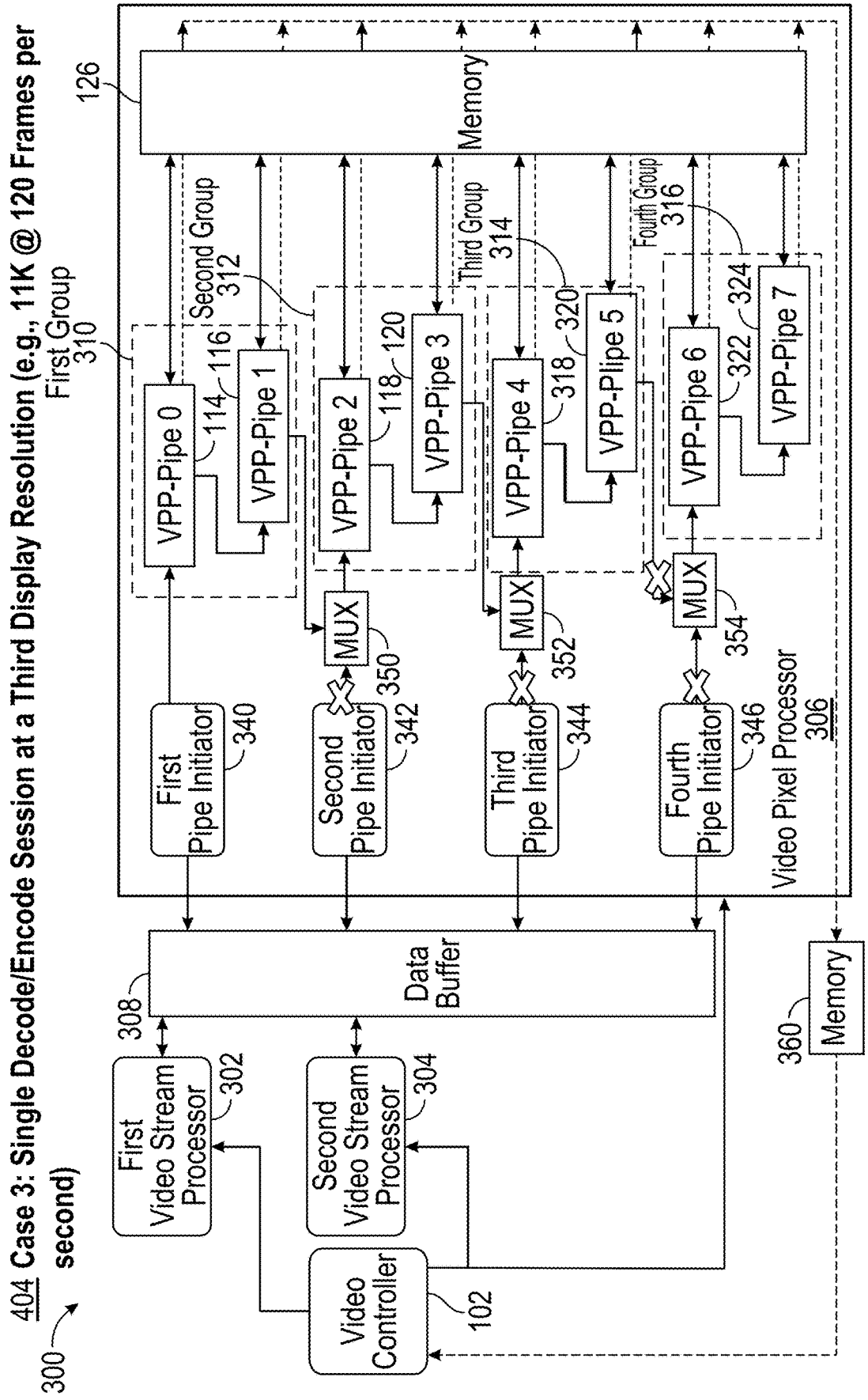
FIG. 4C depicts the video pixel processor of the video processing system of FIG. 3 dynamically configured in a third vide processing architecture for a third use case according to various aspects of the present disclosure.

FIG. 4C illustrates a third video processing architecture of the video pixel processor 306 to support a third use case 404 involving a single session at a third display resolution (e.g., 11K at a refresh rate of 120 Hz). Similar to the first use case 400 and the second use case 402 discussed above with reference to FIGS. 4A and 4B, the third use case 404 is a single decode/encode session. Thus, only the first pipe initiator 340 is active (e.g., configured in the first power state) when the video pixel processor 306 is configured in the third video processing architecture. However, in contrast to the second use case 402 discussed above with reference to FIG. 4B, the third use case 404 utilizes the third group of video processing pipelines 314. Thus, for the third video processing architecture configuration depicted in FIG. 4C, the second multiplexer 352 couples the third group of video processing pipelines 314 to the second group of video processing pipelines 312 so that the first video processing pipeline 114, the second video processing pipeline 116, the third video processing pipeline 118, the fourth video processing pipeline 120, the fifth video processing pipeline 318, and the sixth video processing pipeline 320 operate in a sequential configuration to process video frames at the third display resolution.

Figure 4D:
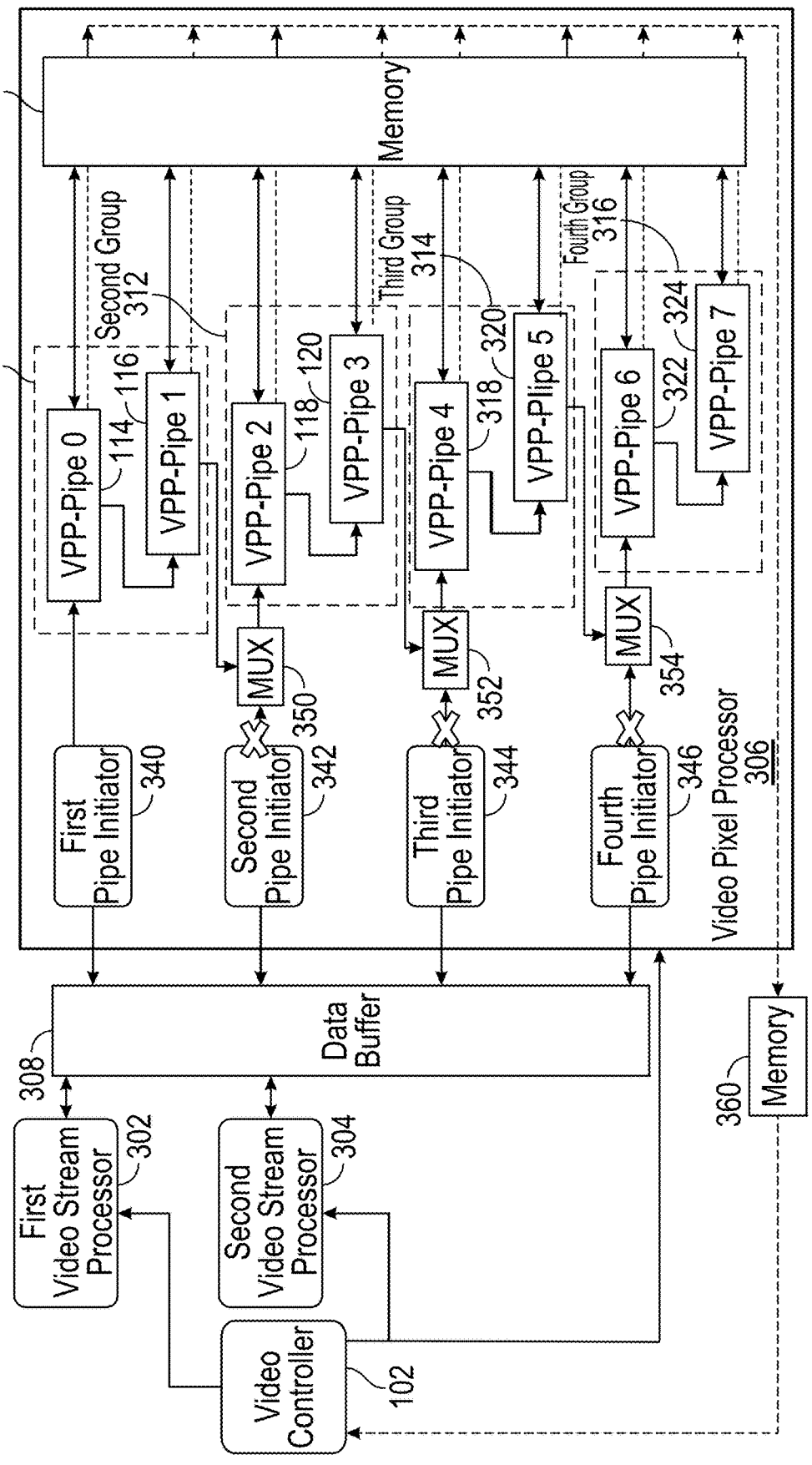
FIG. 4D depicts the video pixel processor of the video processing system of FIG. 3 dynamically configured in a fourth video processing architecture for a fourth use case according to various aspects of the present disclosure.

FIG. 4D illustrates a fourth video processing architecture of the video pixel processor 306 to support a fourth use case 406 involving a single session at a fourth display resolution (e.g., 12K at a refresh rate of 120 Hz). Similar to the first use case 400, second use case 402, and third use case 404 discussed above with reference to FIGS. 4A, 4B, and 4C, the fourth use case 406 is a single decode/encode session. Thus, only the first pipe initiator 340 is active (e.g., configured in the first power state) when the video pixel processor 306 is configured in the fourth video processing architecture. However, in contrast to the third use case 404 discussed above with reference to FIG. 4C, the fourth use case 406 utilizes the fourth group of video processing pipelines 316. Thus, for the fourth video processing architecture depicted in FIG. 4D, the third multiplexer 354 couples the fourth group of video processing pipelines 316 to the third group of video processing pipelines 314. In this manner, the first video processing pipeline 114, the second video processing pipeline 116, the third video processing pipeline 118, the fourth video processing pipeline 120, the fifth video processing pipeline 318, the sixth video processing pipeline 320, the seventh video processing pipeline 322, and the eight video processing pipeline 324 operate in a sequential configuration to process video frames at the fourth display resolution.

In FIGS. 4A-4D, the memory 126 of the video pixel processor 306 is configured in a first configuration (e.g., pool configuration) since the video pixel processor 306 is being utilized for a single session. In the first configuration, the entire memory space of the memory 126 may be shared by the different groups of video processing pipelines. For example, each of the first group of video processing pipelines 310, the second group of video processing pipelines 312, the third group of video processing pipelines 314, and the fourth group of video processing pipelines may have access to the entire memory space of the memory 126.

Figure 4E:
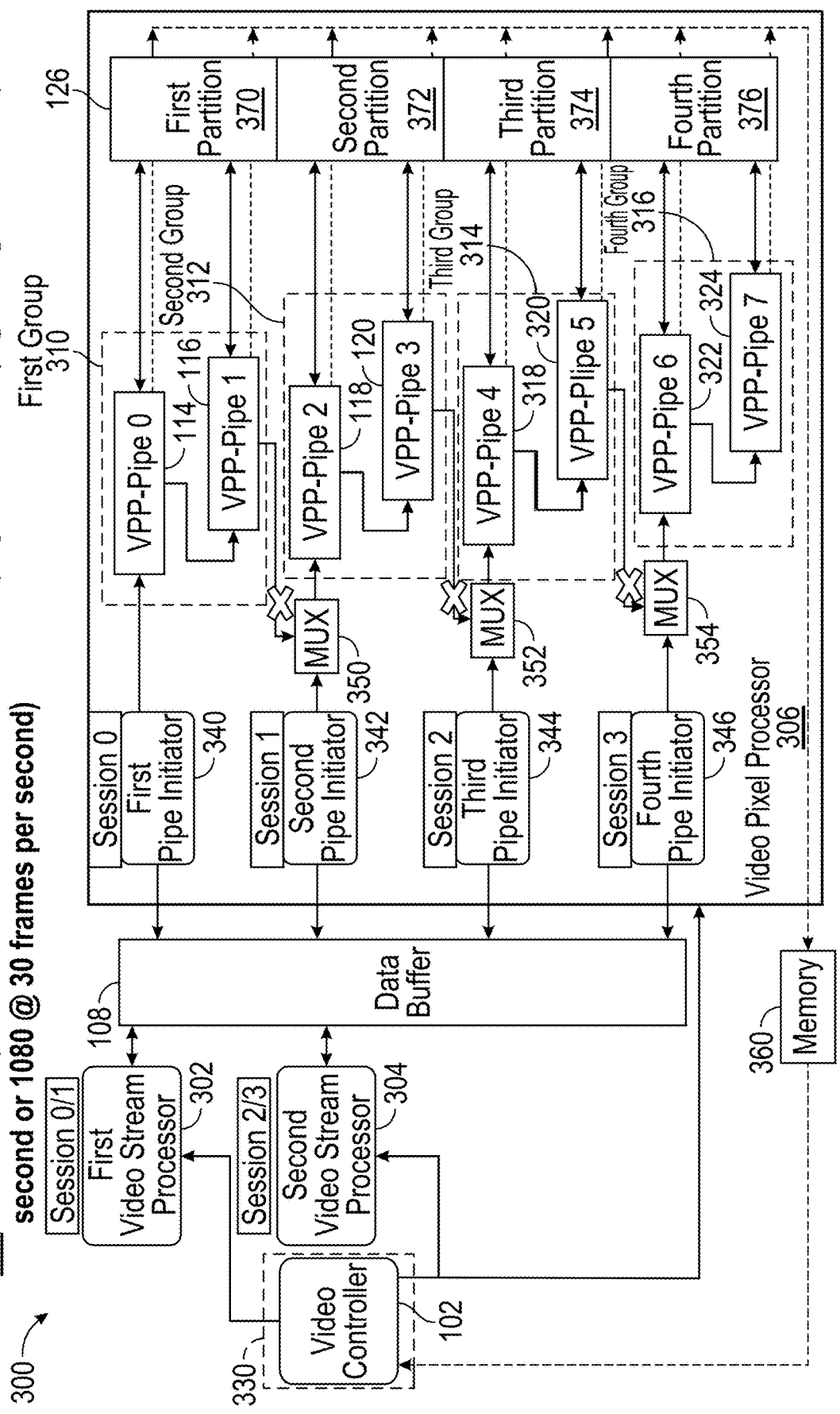
FIG. 4E depicts the video pixel processor of the video processing system of FIG. 3 dynamically configured in a fifth video processing architecture for a fifth use case according to various aspects of the present disclosure.

FIG. 4E illustrates a fifth video processing architecture of the video pixel processor 306 to support a fifth use case 408 involving multiple sessions at the same time. As illustrated, the first multiplexer 350 is configured to couple the second group of video processing pipelines 312 to the second pipe initiator 342, the second multiplexer 352 is configured to couple the third group of video processing pipelines 314 to the third pipe initiator 344, and the third multiplexer 354 is configured to couple the fourth group of video processing pipelines 316 to the fourth pipe initiator 346. In this manner, the video pixel processor 306 may support four separate sessions (e.g., SESSION 0, SESSION 1, SESSION 2, SESSION 3). Furthermore, in contrast to the architecture configurations discussed above with reference to FIGS. 4B-4D, each of the first pipe initiator 340, the second pipe initiator 342, the third pipe initiator 344, and the fourth pipe initiator 346 are configured in the first power state (e.g., active).

Also, as illustrated, the first video stream processor 302 may communicate with both the first pipe initiator 340 and the second pipe initiator 342 via the data buffer 108 to provide data (e.g., video data) for the first session (SESSION 0) and the second session (SESSION 1). Likewise, the second video stream processor 304 may communicate with both the third pipe initiator 344 and the fourth pipe initiator 346 via the data buffer 108 to provide data (e.g., video data) for the third session (SESSION 2) and the fourth session (SESSION 3).

Figure 4F:
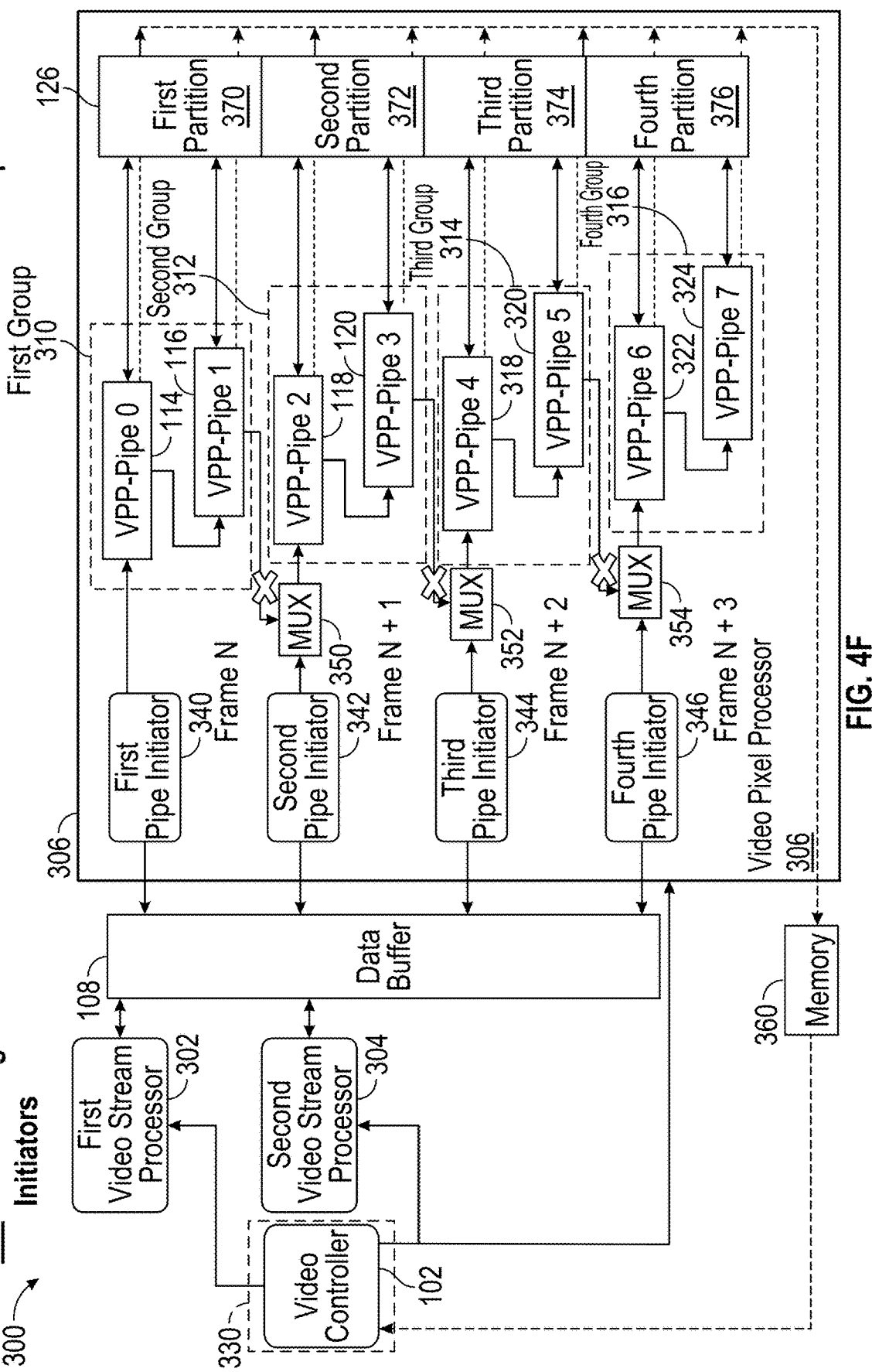
FIG. 4F depicts the video pixel processor of the video processing system of FIG. 3 dynamically configured in the fifth video processing architecture for a sixth use case according to various aspects of the present disclosure.

FIG. 4F illustrates the fifth video processing architecture of the video pixel processor 306 being used to support a sixth use case 410 involving a single session in which individual frames of the session are processed by a different group of the video processing pipelines. The sixth use case may be applicable to certain data compression techniques (e.g., lossy, or lossless all intra frames) used in applications in the automotive, mobile phone, and augmented reality space. As an example, an initial frame, N, of the video stream may go through the first video stream processor 302, the first pipe initiator 340, and the first group of video processing pipelines 310. An additional frame, N+1, of the video stream may go through the first video stream processor 302, the second pipe initiator 342, and the second group of video processing pipelines 312. Yet another frame, N+2, of the video stream may go through the second video stream processor 304, the third pipe initiator 344, and the third group of video processing pipelines 314. Still further, another frame, N+3, of the video stream may go through the second video stream processor 304, the fourth pipe initiator 346 and the fourth group of video processing pipelines 316. In this manner, each video frame in the single session may be processed by a dedicated group of video processing pipelines.

In FIG. 4E and FIG. 4F, the memory 126 of the video pixel processor 306 has a second configuration (e.g., partitioned) that is different from the first configuration (e.g., pool) discussed above with reference to FIGS. 4A-4D since the video pixel processor 306 illustrated in FIG. 4E and FIG. 4F is being utilized for multiple sessions. In the second configuration, the memory space of the memory 126 is partitioned into a first partition 370, a second partition 372, a third partition 374, and a fourth partition 376. The first partition 370 may be reserved for storing data received from the first group of video processing pipelines 310. The second partition 372 may be reserved for storing data received from the second group of video processing pipelines 312. The third partition 374 may be reserved for storing data received from the third group of video processing pipelines 314. The fourth partition 376 may be reserved for storing data received from the fourth group of video processing pipelines 316.

Example Method of Dynamically Configuring a Video Processing Architecture

Figure 5:
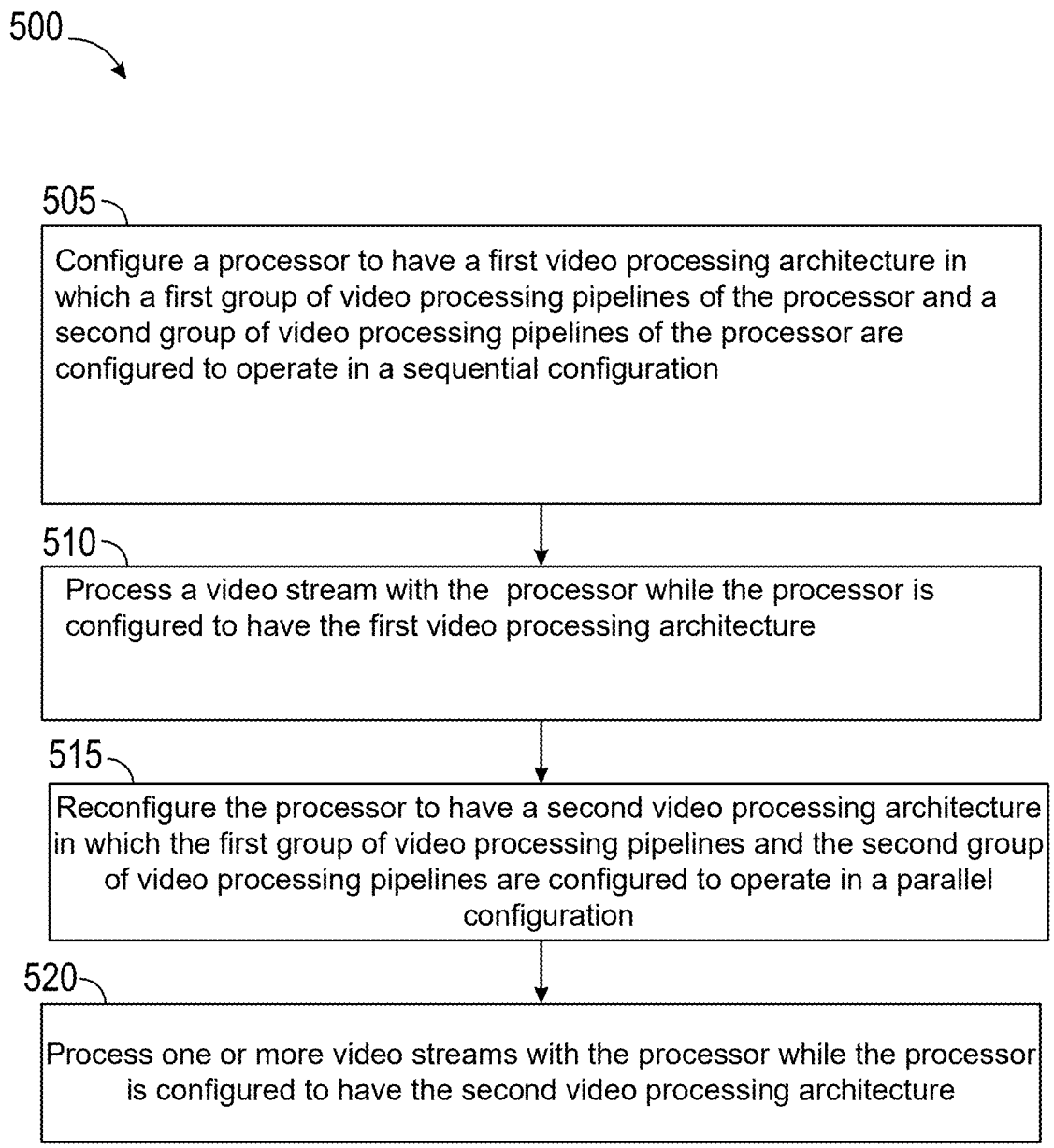
FIG. 5 depicts a method for dynamically configuring a video processing architecture according to various aspects of the present disclosure.

FIG. 5 is a diagram depicting an example method 500 for dynamically configuring a video processing architecture, according to various aspects of the present disclosure. For example, method 500 may be performed by control logic 330 of the video processing system 300 of FIG. 3. Furthermore, although FIG. 5 depicts steps performed in a particular order for purposes of illustration and discussion, the method 500 discussed herein is not intended to be limited to any particular order or arrangement. One skilled in the art, using the disclosure provided herein, will appreciate that various steps of the method 500 can be omitted, rearranged, combined and/or adapted in various ways without deviating from the scope of the present disclosure.

At 505, the method 500 includes configuring a processor (e.g., video pixel processor 306 of FIG. 3) to have a first video processing architecture (e.g., architectures depicted in FIGS. 4B-4D) in which a first group of video processing pipelines (e.g., first group of video processing pipelines 310) of the processor and a second group of video processing pipelines (e.g., second group of video processing pipelines 312) are configured to operate in a sequential configuration (e.g., as illustrated in FIGS. 4B-4D). At 510, the method 500 includes processing a video stream while the processor is configured to have the first video processing architecture.

At 515, the method 500 includes reconfiguring the processor to have a second video processing architecture (e.g., architecture depicted in FIGS. 4E and 4F) in which the first group of video processing pipelines and the second group of video processing pipelines are configured to operate in a parallel configuration. At 520, the method 500 includes processing one or more video streams while the processor is configured to have the second video processing architecture.

In certain aspects, configuring the processor to have the first video processing architecture includes configuring a multiplexer (e.g., first multiplexer 350) of the processor to couple the second group of video processing pipelines to the first group of video processing pipelines to configure the first group of video processing pipelines and the second group of video pixel processing pipelines to operate in the sequential configuration as illustrated in FIGS. 4B, 4C, and 4D. Furthermore, in certain aspects, configuring the processor to have the first video processing architecture may include adjusting a power state of a second pipe initiator (e.g., second pipe initiator 342) of the processor. For example, the power state of the second pipe initiator may be switched from the first power state to the second power state to decrease power consumption by the second pipe initiator. As mentioned above, in some instances, the second power state may correspond to a sleep state in which the second power initiator consumes a nominal amount of power that is less than an amount of power the second pipe initiator consumes in the first power state. Alternatively, the second power state may correspond to an off state in which the second power initiator consumes no power.

In certain aspects, configuring the processor to have the second video processing architecture includes configuring the multiplexer to couple the second group of video processing pipelines to the second pipe initiator to configure the first group of video processing pipelines and the second group of video processing pipelines to operate in the parallel configuration as illustrated in FIG. 4E and FIG. 4F. Furthermore, in certain aspects, configuring the video pixel processor to have the second video processing architecture may include adjusting the power state of the second pipe initiator from the second power state to the first power state to increase power consumption of the second pipe initiator. For example, as mentioned above, the second power state may correspond to a sleep state and adjusting the power state of the second pipe initiator may include waking the second pipe initiator from the sleep state such that the second pipe initiator begins consuming a greater amount of power compared to an amount of power the second pipe initiator was consuming while in the sleep state.

Example Processing System

Figure 6:
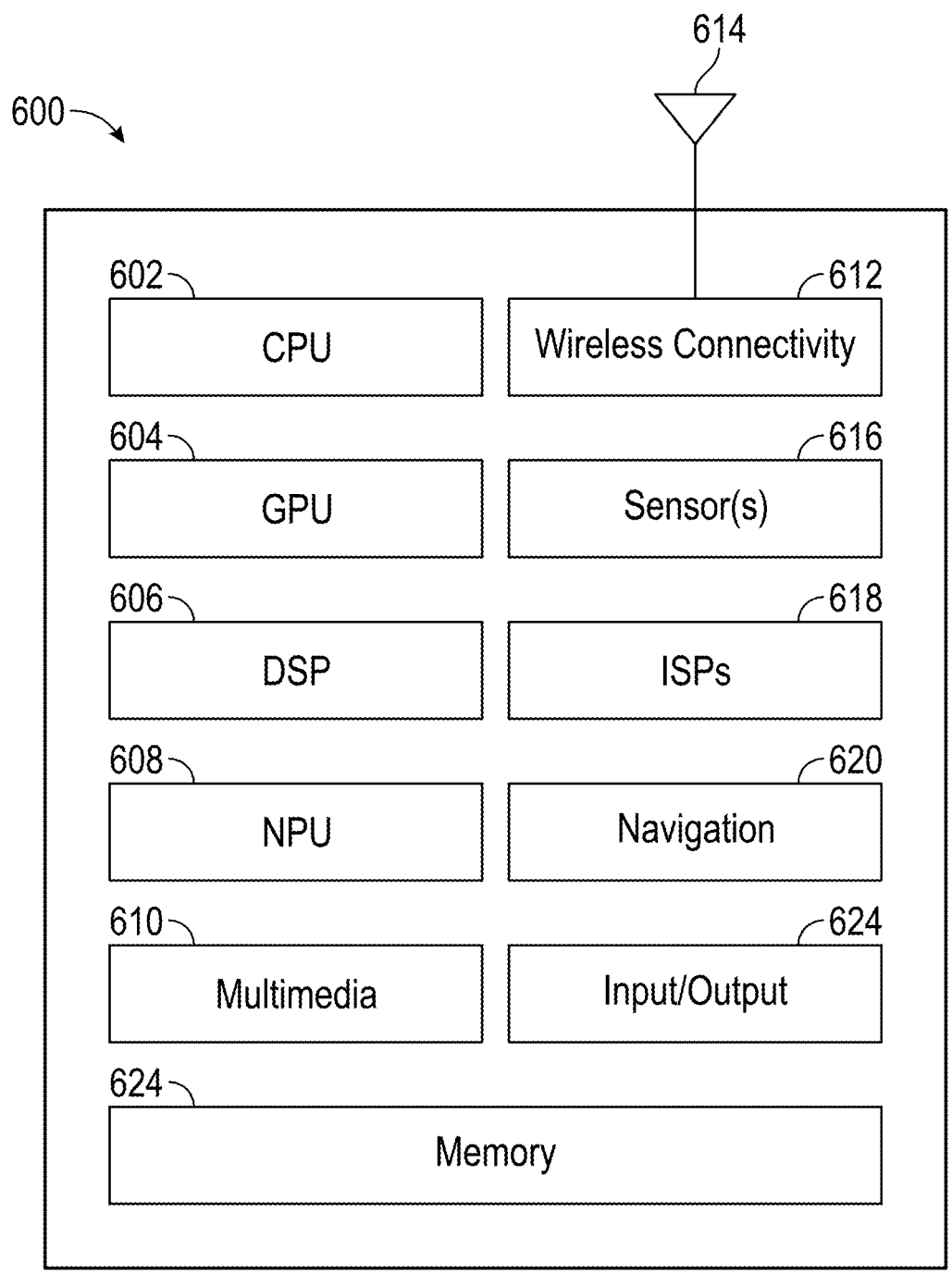
FIG. 6 depicts an example processing system in which a video processing system may be included according to various aspects of the present disclosure.

In some aspects, the video processing system 100 discussed above with reference to FIG. 3 may be include in a device or processing system. FIG. 6 depicts an example processing system 600. Although depicted as a single system for conceptual clarity, in some aspects, as discussed above, the operations described below with respect to the processing system 600 may be distributed across any number of devices or systems.

The processing system 600 includes a central processing unit (CPU) 602. Instructions executed at the CPU 602 may be loaded, for example, from a memory 624 associated with the CPU 602.

The processing system 600 also includes additional processing components tailored to specific functions, such as a graphics processing unit (GPU) 604, a digital signal processor (DSP) 606, a neural processing unit (NPU) 608, a multimedia component 610 (e.g., a multimedia processing unit), and a wireless connectivity component 612.

An NPU, such as NPU 608, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 608, are configured to accelerate the performance of common machine learning tasks, such as image classification, machine translation, object detection, and various other predictive models. In some examples, a plurality of NPUs may be instantiated on a single chip, such as a SoC, while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 608 is a part of one or more of the CPU 602, the GPU 604, and/or the DSP 606.

In some examples, the wireless connectivity component 612 may include subcomponents, for example, for third generation (3G) connectivity, fourth generation (4G) connectivity (e.g., 4G Long-Term Evolution (LTE)), fifth generation connectivity (e.g., 5G or New Radio (NR)), Wi-Fi connectivity, Bluetooth connectivity, and/or other wireless data transmission standards. The wireless connectivity component 612 is further coupled to one or more antennas 614.

The processing system 600 may also include one or more sensor processing units 616 associated with any manner of sensor, one or more image signal processors (ISPs) 618 associated with any manner of image sensor, and/or a navigation processor 620, which may include satellite-based positioning system components (e.g., GPS or GLONASS), as well as inertial positioning system components.

The processing system 600 may also include one or more input and/or output devices 622, such as screens, touch-sensitive surfaces (including touch-sensitive displays), physical buttons, speakers, microphones, and the like.

In some examples, one or more of the processors of the processing system 600 may be based on an ARM or RISC-V instruction set.

The processing system 600 also includes the memory 624, which is representative of one or more static and/or dynamic memories, such as a dynamic random access memory, a flash-based static memory, and the like. In this example, the memory 624 includes computer-executable components, which may be executed by one or more of the aforementioned processors of the processing system 600.

Generally, the processing system 600 and/or components thereof may be configured to perform the methods described herein.

Notably, in other aspects, elements of the processing system 600 may be omitted, such as where the processing system 600 is a server computer or the like. For example, the multimedia component 610, the wireless connectivity component 612, the sensor processing units 616, the ISPs 618, and/or the navigation processor 620 may be omitted in other aspects. Further, aspects of the processing system 600 may be distributed between multiple devices.

EXAMPLE CLAUSES

In addition to the various aspects described above, specific combinations of aspects are within the scope of the disclosure, some of which are detailed below:

Aspect 1: An apparatus comprising: memory; and one or more processors comprising: a first group of video processing pipelines in data communication with the memory, the first group of video processing pipelines comprising a first video processing pipeline and a second video processing pipeline in data communication with the first video processing pipeline; a second group of video processing pipelines in data communication with the memory, the second group of video processing pipelines comprising a third video processing pipeline and a fourth video processing pipeline in data communication with the third video processing pipeline; and control logic including a first pipe initiator for the first group of video processing pipelines and a second pipe initiator for the second group of video processing pipelines, the control logic configured to selectively couple the second group of video processing pipelines to the first group of video processing pipelines or the second pipe initiator.

Aspect 2: The apparatus of Aspect 1, wherein the first group of video processing pipelines and the second group of video processing pipelines are configured to operate in a sequential configuration when the second group of video processing pipelines is coupled to the first group of video processing pipelines; or the first group of video processing pipelines and the second group of video processing pipelines are configured to operate in a parallel configuration when the second group of video processing pipelines is coupled to the second pipe initiator.

Aspect 3: The apparatus of Aspect 2, wherein the memory is configured in a first configuration when the first group of video processing pipelines and the second group of video processing pipelines are configured to operate in the sequential configuration, and wherein the memory is configured in a second configuration when the first group of video processing pipelines and the second group of video processing pipelines are configured to operate in the parallel configuration.

Aspect 4: The apparatus of Aspect 3, wherein: in the first configuration, the first group of video processing pipelines and the second group of video processing pipelines share one or more memory cells of the memory; and in the second configuration, the memory is partitioned into a first group of memory cells for the first group of video processing pipelines and a second group of memory cells for the second group of video processing pipelines.

Aspect 5: The apparatus of any of Aspects 1 to 4, wherein: the second pipe initiator is configured in a first power state while the second group of video processing pipelines is coupled to the second pipe initiator; the second pipe initiator is configured in a second power state while the second group of video processing pipelines is coupled to the first group of video processing pipelines; and the second pipe initiator consumes more power in the first power state than in the second power state.

Aspect 6: The apparatus of any of Aspects 1 to 5, wherein the first pipe initiator is in data communication with the first video processing pipeline of the first group of video processing pipelines.

Aspect 7: The apparatus of any of Aspects 1 to 6, wherein the control logic comprises a multiplexer coupled between the first group of video processing pipelines and the second group of video processing pipelines.

Aspect 8: The apparatus of Aspect 7, wherein the multiplexer is further coupled to the second pipe initiator.

Aspect 9: The apparatus of any of Aspects 1 to 8, further comprising: a data buffer in data communication with the first pipe initiator and the second pipe initiator; and a video stream processor in data communication with the data buffer.

Aspect 10: The apparatus of Aspect 9, wherein: when the second group of video processing pipelines is coupled to the first group of video processing pipelines, the video stream processor is in data communication with the first group of video processing pipelines and the second group of video processing pipelines; and when the second group of video processing pipelines is coupled to the second pipe initiator, the video stream processor is in data communication with the first group of video processing pipelines and an additional video stream processor is in data communication with the second group of video processing pipelines.

Aspect 11: The apparatus of any of Aspects 1 to 10, wherein the first video processing pipeline, the second video processing pipeline, the third video processing pipeline, and the fourth video processing pipeline include at least one of: a quantization engine; an inverse quantization engine, a transform engine, an inverse transform engine, a motion engine, a filtering engine, or a post-processing engine.

Aspect 12: A method of dynamically configuring a video processing architecture, comprising: configuring one or more processors to have a first video processing architecture in which a first group of video processing pipelines and a second group of video processing pipelines are configured to operate in a sequential configuration; processing a video stream with the one or more processors while the one or more processors are configured to have the first video processing architecture; reconfiguring the one or more processors to have a second video processing architecture in which the first group of video processing pipelines and the second group of video processing pipelines are configured to operate in a parallel configuration; and processing one or more video streams with the one or more processors while the one or more processors are configured to have the second video processing architecture.

Aspect 13: The method of Aspect 12, wherein the one or more processors comprises control logic including a first pipe initiator for the first group of video processing pipelines, a second pipe initiator for the second group of video processing pipelines, and a multiplexer coupled between the first group of video processing pipelines and the second group of video processing pipelines, and wherein configuring the one or more processors to have the first video processing architecture comprises: configuring the multiplexer to couple the second group of video processing pipelines to the first group of video processing pipelines.

Aspect 14: The method of Aspect 13, wherein configuring the one or more processors to have the first video processing architecture further comprises: adjusting a power state of the second pipe initiator from a first power state to a second power state to decrease power consumption of the second pipe initiator.

Aspect 15: The method of Aspect 14, wherein configuring the one or more processors to have the second video processing architecture comprises: configuring the multiplexer to couple the second group of video processing pipelines to the second pipe initiator.

Aspect 16: The method of Aspect 15, wherein configuring the one or more processors to have the second video processing architecture comprises adjusting a power state of the second pipe initiator from the second power state to the first power state to increase the power consumption of the second pipe initiator.

Aspect 17: The method of any of Aspects 12 to 16, wherein configuring the one or more processors to have the first video processing architecture further comprises configuring a memory in data communication with the first group of video processing pipelines and the second group of video processing pipelines in a first configuration in which the first group of video processing pipelines and the second group of video processing pipelines share one or more memory cells of the memory.

Aspect 18: The method of Aspect 17, wherein configuring the one or more processors to have the second video processing architecture further comprises configuring the memory in a second configuration in which the memory is partitioned into a first group of memory cells for the first group of video processing pipelines and a second group of memory cells for the second group of video processing pipelines.

Aspect 19: The method of any of Aspects 12 to 18, wherein the one or more video streams comprises a first video stream and a second video stream, and wherein processing the one or more video streams comprises: processing a video frame of the first video stream with the first group of video processing pipelines; and processing a video frame of the second video stream with the second group of video processing pipelines.

Aspect 20: An apparatus, comprising: means for configuring one or more processors to have a first video processing architecture in which a first group of video processing pipelines and a second group of video processing pipelines are configured to operate in a sequential configuration; means for processing a video stream with the one or more processors while the one or more processors are configured to have the first video processing architecture; means for reconfiguring the one or more processors to have a second video processing architecture in which the first group of video processing pipelines and the second group of video processing pipelines are configured to operate in a parallel configuration; and means for processing one or more video streams with the one or more processors while the one or more processors are configured to have the second video processing architecture.

Additional Considerations

The various operations of methods described above may be performed by any suitable means capable of performing the corresponding functions. The means may include various hardware and/or software components(s) module(s), including, but not limited to a circuit or processor. Generally, where there are operations illustrated in figures, those operations may have corresponding counterpart means-plus-function components with similar numbering.

For example, means for configuring one or more processors to have a first video processing architecture in which a first group of video processing pipelines and a second group of video processing pipelines are configured to operate in a sequential configuration may include control logic (e.g., video controller, multiplexers, and pipe initiators). Means for processing a video stream with the one or more processors while the one or more processors are configured to have the first video processing architecture may include the video controller, video stream processor, and video pixel processor. Means for reconfiguring the one or more processors to have a second video processing architecture in which the first group of video processing pipelines and the second group of video processing pipelines are configured to operate in a parallel configuration may include the control logic. Finally, means for processing one or more video streams with the one or more processors while the one or more processors are configured to have the second video processing architecture may include the video controller, the video stream processor, and the video pixel processor.

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus, comprising:
    memory; and
    one or more processors comprising:
        a first group of video processing pipelines in data communication with the memory, the first group of video processing pipelines comprising a first video processing pipeline and a second video processing pipeline in data communication with the first video processing pipeline;
        a second group of video processing pipelines in data communication with the memory, the second group of video processing pipelines comprising a third video processing pipeline and a fourth video processing pipeline in data communication with the third video processing pipeline; and
        control logic including a first pipe initiator for the first group of video processing pipelines and a second pipe initiator for the second group of video processing pipelines, the control logic configured to selectively couple the second pipe initiator or the first group of video processing pipelines to the second group of video processing pipelines,
    wherein:
        the second pipe initiator is configured to operate in a first power state when the control logic is configured to couple the first group of video processing pipelines to the second group of video processing pipelines instead of the second pipe initiator; and
        the second pipe initiator is configured to operate in a second power state when the control logic is configured to couple the second pipe initiator to the second group of video processing pipelines instead of the first group of video processing pipelines.

2. The apparatus of claim 1, wherein:
    the first group of video processing pipelines and the second group of video processing pipelines are configured to operate in a sequential configuration when the control logic is configured to couple the first group of video processing pipelines to the second group of video processing pipelines; or
    the first group of video processing pipelines and the second group of video processing pipelines are configured to operate in a parallel configuration when the control logic is configured to couple the second pipe initiator to the second group of video processing pipelines.

3. The apparatus of claim 2, wherein the memory is configured in a first configuration when the first group of video processing pipelines and the second group of video processing pipelines are configured to operate in the sequential configuration, and wherein the memory is configured in a second configuration when the first group of video processing pipelines and the second group of video processing pipelines are configured to operate in the parallel configuration.

4. The apparatus of claim 3, wherein:
    in the first configuration, the first group of video processing pipelines and the second group of video processing pipelines share one or more memory cells of the memory; and
    in the second configuration, the memory is partitioned into a first group of memory cells for the first group of video processing pipelines and a second group of memory cells for the second group of video processing pipelines.

5. The apparatus of claim 1, wherein the first pipe initiator is in data communication with the first video processing pipeline of the first group of video processing pipelines.

6. The apparatus of claim 1, wherein the control logic comprises a multiplexer coupled between the first group of video processing pipelines and the second group of video processing pipelines.

7. The apparatus of claim 6, wherein the multiplexer is further coupled to the second pipe initiator.

8. The apparatus of claim 1, further comprising:
    a data buffer in data communication with the first pipe initiator and the second pipe initiator; and
    a video stream processor in data communication with the data buffer.

9. The apparatus of claim 8, wherein:
    when the control logic is configured to couple the first group of video processing pipelines to the second group of video processing pipelines, the video stream processor is in data communication with the first group of video processing pipelines and the second group of video processing pipelines; and
    when the control logic is configured to couple the second pipe initiator to the second group of video processing pipelines, the video stream processor is in data communication with the first group of video processing pipelines and an additional video stream processor is in data communication with the second group of video processing pipelines.

10. The apparatus of claim 1, wherein the first video processing pipeline, the second video processing pipeline, the third video processing pipeline, and the fourth video processing pipeline include at least one of: a quantization engine; an inverse quantization engine, a transform engine, an inverse transform engine, a motion engine, a filtering engine, or a post-processing engine.

11. A method of dynamically configuring a video processing architecture, comprising:
- configuring one or more processors to have a first video processing architecture in which a first group of video processing pipelines is coupled to a second group of video processing pipelines instead of a pipe initiator for the second group of video processing pipelines, wherein the pipe initiator is configured to operate in a first power state when the first group of video processing pipelines is coupled to the second group of video processing pipelines;
- processing a video stream with the one or more processors while the one or more processors are configured to have the first video processing architecture;
- reconfiguring the one or more processors to have a second video processing architecture in which the pipe initiator is coupled to the second group of video processing pipelines instead of the first group of video processing pipelines, wherein the pipe initiator is configured to operate in a second power state when coupled to the second group of video processing pipelines; and
- processing one or more video streams with the one or more processors while the one or more processors are configured to have the second video processing architecture.

12. The method of claim 11, wherein the one or more processors comprises control logic including a multiplexer coupled between the first group of video processing pipelines and the second group of video processing pipelines, and wherein configuring the one or more processors to have the first video processing architecture comprises:
- configuring the multiplexer to couple the first group of video processing pipelines to the second group of video processing pipelines.

13. The method of claim 12, wherein configuring the one or more processors to have the first video processing architecture further comprises:
- adjusting a power state of the pipe initiator from the second power state to the first power state.

14. The method of claim 13, wherein configuring the one or more processors to have the second video processing architecture comprises:
- configuring the multiplexer to couple the pipe initiator to the second group of video processing pipelines.

15. The method of claim 14, wherein configuring the one or more processors to have the second video processing architecture comprises:
- adjusting the power state of the pipe initiator from the first power state to the second power state.

16. The method of claim 11, wherein configuring the one or more processors to have the first video processing architecture further comprises configuring a memory in data communication with the first group of video processing pipelines and the second group of video processing pipelines in a first configuration in which the first group of video processing pipelines and the second group of video processing pipelines share one or more memory cells of the memory.

17. The method of claim 16, wherein configuring the one or more processors to have the second video processing architecture further comprises configuring the memory in a second configuration in which the memory is partitioned into a first group of memory cells for the first group of video processing pipelines and a second group of memory cells for the second group of video processing pipelines.

18. The method of claim 11, wherein the one or more video streams comprises a first video stream and a second video stream, and wherein processing the one or more video streams comprises:
- processing a video frame of the first video stream with the first group of video processing pipelines; and
- processing a video frame of the second video stream with the second group of video processing pipelines.

19. An apparatus, comprising:
- means for configuring one or more processors to have a first video processing architecture in which a first group of video processing pipelines is coupled to a second group of video processing pipelines instead of a pipe initiator for the second group of video processing pipelines, wherein the pipe initiator is configured to operate in a first power state when the first group of video processing pipelines is coupled to the second group of video processing pipelines;
- means for processing a video stream with the one or more processors while the one or more processors are configured to have the first video processing architecture;
- means for reconfiguring the one or more processors to have a second video processing architecture in which pipe initiator is coupled to the second group of video processing pipelines instead of the first group of video processing pipelines, wherein the pipe initiator is configured to operate in a second power state when coupled to the second group of video processing pipelines; and
- means for processing one or more video streams with the one or more processors while the one or more processors are configured to have the second video processing architecture.

* * * * *